May 27, 1969  R. J. COFFELT  3,446,139
SERPENTINE WINE PRESS
Filed May 10, 1966

INVENTOR.
ROBERT J. COFFELT
BY Naylor & Neal
ATTORNEYS

INVENTOR.
ROBERT J. COFFELT
BY Naylor & Neal
ATTORNEYS

United States Patent Office 3,446,139
Patented May 27, 1969

3,446,139
SERPENTINE WINE PRESS
Robert J. Coffelt, Davis, Calif., assignor to The Regents of the University of California, Berkeley, Calif.
Filed May 10, 1966, Ser. No. 548,961
Int. Cl. B30b 9/24, 5/04
U.S. Cl. 100—118
9 Claims

ABSTRACT OF THE DISCLOSURE

A press employing a pair of perforated belts containing a pack of fruit therebetween which are entrained over a plurality of rollers in a serpentine path. The distance between rollers is greater than the sum of the thicknesses of the belts and the fruit pack, and the belts are maintained under substantial tension so that the fruit pack is compressed as the belts move over each roller and decompressed as the belts move from one roller to the next. The press includes adjustable input rollers to prevent fruit pile-up at the input end of the serpentine path, fluid piston tensioning means with a common source of fluid pressure for tensioning alternate belt supporting rollers, and a belt having a central perforated portion through which juice is extracted and marginal unperforated portions which impart tensile strength to the belts and facilitate the formation of a fruit receiving pocket between the belts.

---

This invention relates to serpentine fruit presses and more particularly to improvements in the construction of the serpentine fruit press shown in my U.S. Patent No. 3,130,667.

The press shown in my above identified patent employs a pair of perforated belts containing a pack of fruit therebetween which are entrained over a plurality of rollers in a serpentine path. The distance between rollers is greater than the sum of the thicknesses of the belts and the fruit pack, and the belts are maintained under substantial tension so that the fruit pack is compressed as the belts move over each roller and decompressed as the belts move from one roller to the next. Actual operation of a serpentine press of this type has now resulted in certain improvements which greatly improve the efficiency of the press. These improvements relate generally to fruit feeding, belt tensioning, and juice extraction.

Fruit feeding

The perforated belts of the serpentine press pass through two general areas, namely (1) an area where the belts are spaced apart and where the fruit feeding and pomace discharge operations are performed, and (2) an area where the belts are positioned close together holding the fruit pack between them. Some difficulties are encountered in feeding the fruit where the belts pass from the first area into the second. If the belts converge toward each other at too large an angle, the fruit which is to be introduced between the belts will pile up and not enter the second area, and if the belts converge at too small an angle, the length of the belts paths at the transition from the first area to the second area becomes excessive. Additionally, the ideal angle at which the belts should approach each other appears to be dependent upon the tension of the belts.

In accordance with this invention, adjustable support means are provided for the two belts for moving one of the belts toward and away from the other belt where fruit is introduced between the belts at the transition between the first and second areas. When the belt tension changes, this adjusting means may be operated to control the angle at which the belts approach each other. Preferably, the adjustable support for one of the belts at this transition comprises at least two rollers which support the belt in a plurality of inclined sections adjacent to a flat section of the other belt. In this way, the two belts converge first at a larger angle and then at a smaller angle as the belts initially compress the fruit. The belts are able to exert high pressure on the fruit in the area of the smaller angle where the application of that higher pressure in the area of the larger angle would cause the fruit to pile up.

Belt tensioning

Substantial advantages may be obtained in the serpentine press by using synthetic plastic materials as the materials from which the perforated belts are made. The synthetic plastics are substantially inert and hence impart no foreign taste to the fruit juices extracted with the press. Additionally, the synthetic plastics may be cleaned very easily and resist corrosive attack by the fruit juices. However, the use of synthetic plastics for the belts provides a serious problem in maintaining adequate belt tension while preventing excessive stretching of the belts.

Thus, the belts in the serpentine press must be subjected to substantial tension because it is the belt tension which is effective to press the juices out of the fruit. The synthetic plastics exhibit appreciable stretching when they are formed into belts which are thin enough to be sufficiently flexible for use in the serpentine path, and the stretching problem is compounded by the fact that the belts are highly perforated.

In accordance with this invention, I have provided a new construction for the perforated belts which provides greater resistance to stretching, and I have provided certain structural improvements in the serpentine press whereby proper belt tension is maintained at each stage of the serpentine path without requiring excessive belt tension on other portions of the belts.

The new belt construction involves the provision of endless unperforated strips of the belts along the belt margins and endless unperforated strips of the belts at intermediate areas between perforated areas. The unperforated strips carry a major part of the belt tension thereby relieving the perforated areas of tension and avoiding excessive stretching. Preferably, the unperforated strips are repeated at least every five inches along the width of the belt so that where, for instance, a belt twenty-four inches wide is employed, the belt may have one inch unperforated strips at each margin with four perforated strips, each five inches wide, separated by three unperforated strips each two-thirds of an inch wide.

Control of belt tension is also provided by new structural features of the press itself including (1) the provision of a plurality of pneumatic cylinders all controlled by a single pneumatic source with the cylinders connected between the frame of the machine and the axles of approximately every other roller supporting each belt and (2) the provision of a new drive for the rollers in the serpentine path. In this latter regard, a series of at least three of the main rollers in the serpentine path are driven by slip clutches and positive driving means arranged so that, absent the slip clutches, the three rollers would be driven at progressively increasing peripheral speeds. With this arrangement, the belt tension where the belt passes over each roller is controlled by the relative driving speeds on other rollers, and hence, increased belt tension is provided in local areas of the belt path without increasing belt tension and the belt stretching problem throughout the path.

Juice extraction

As indicated above, the serpentine press operates to press juice out of fruit by repeated compression and decompression. Excessive compression of the pomace and grinding of the pomace are avoided since these severe actions cause seeds in the pomace to break and release materials which adversely affect the taste of the juice. Since severe physical stress on the pomace is avoided, it may be difficult in some situations to remove all of the juice from the fruit, and in these situations, it is desirable to apply an air pressure differential across the belts to draw the remaining juice from the pomace. This is preferably done by applying suction to the belts at one of the last stages of the press so that relative air flow through the juice and juice oxidation will be reduced to a minimum.

Other features and advantages of the invention will become apparent from the following description read in conjunction with the attached drawings in which.

Figure 1:
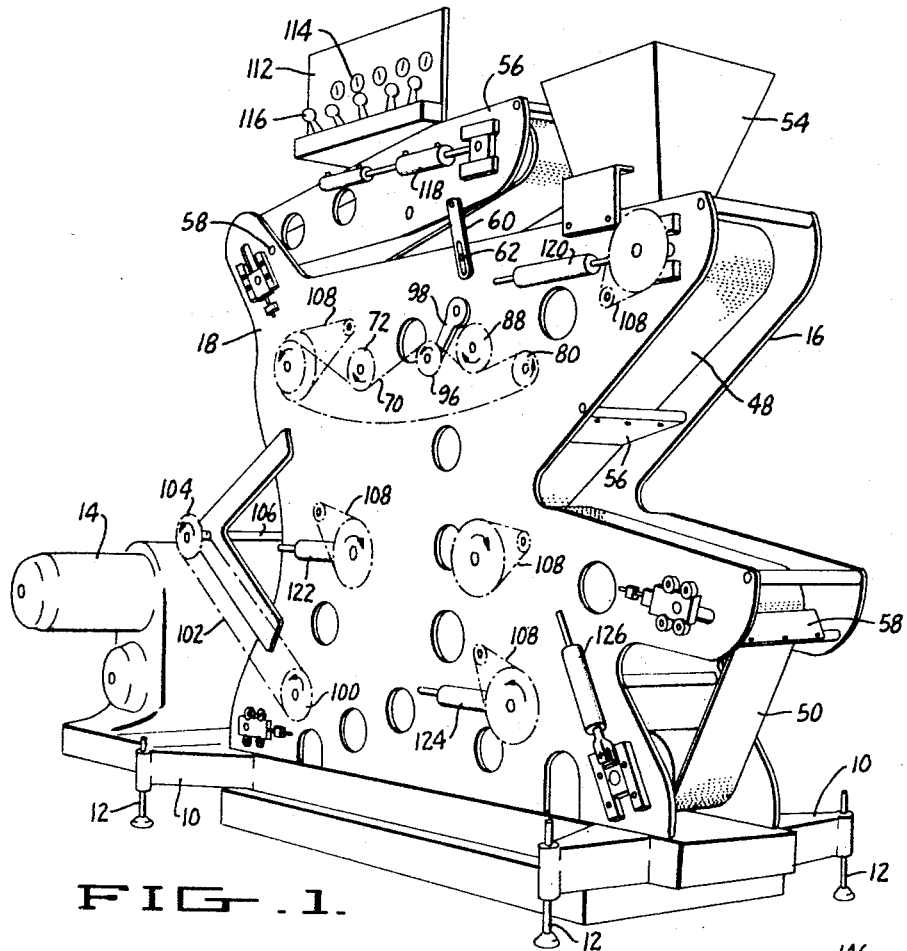
FIG. 1 is a perspective view of a serpentine wine press embodying the principles of this invention.

Referring now in detail to the drawings, the press includes a base 10 provided with leveling jacks 12 and supporting a drive motor and transmission assembly 14. A pair of side frame members 16 and 18 are mounted on the base 10 and support between them a plurality of driven rollers 20, 22, 24, 26 and 28 (FIG. 4) and a plurality of idler rollers 30, 32, 34, 36, 38, 40 and 42.

A plurality of cross bars 44 extend between the two side frame members 16 and 18, and interior baffles 46 are mounted on some of the cross bars 44 for catching fruit juices and delivering them from the press as explained in the above mentioned patent.

Figure 4:
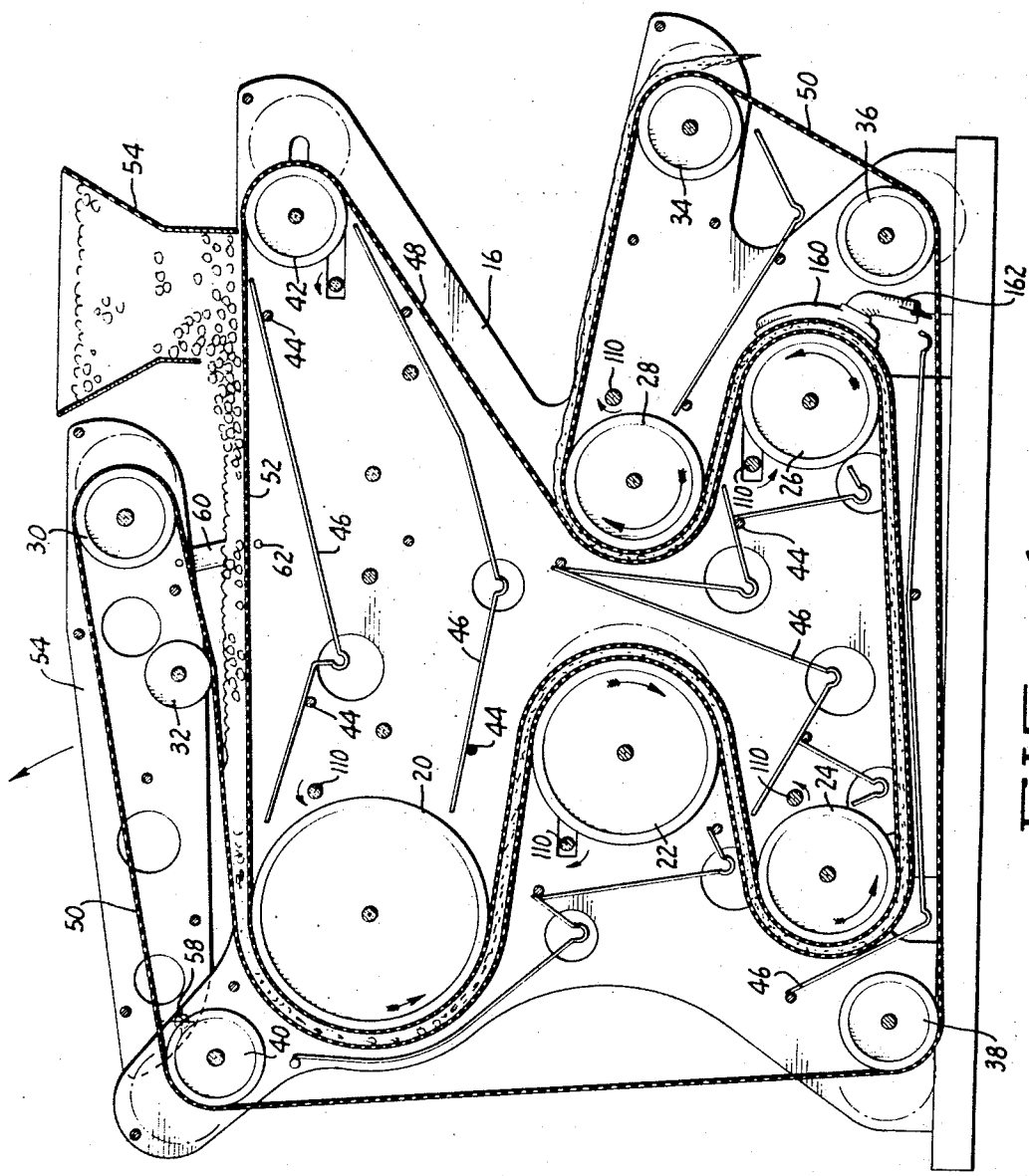
FIG. 4 is a central cross-sectional view in elevation of the wine press of FIG. 1.

A pair of perforated plastic belts 48 and 50 are entrained over the rollers 20–42 as illustrated in FIG. 4 with the belt passing through a serpentine press path commencing at the top of the roller 20 and extending around the periphery of the roller 20 and hence over rollers 22, 24, 26 and 28. The belt 50 extends from the serpentine path over the idler rollers 34, 36, 38, 40, 30 and 32 back to the serpentine path, and the belt 48 extends from the serpentine path over idler roller 42 and back to the serpentine path along a substantially flat horizontal reach 52.

A hopper 54 is mounted over the reach 52 of the belt 48 to introduce fruit into the press by depositing the fruit on the reach 52, and scrappers 56 and 58 (FIG. 1) are provided to scrape the pomace off of the belts and discharge the pomace from the machine at the scrapper 58.

*Fruit feeding*

As indicated above, difficulties may be encountered in introducing fruit between the belts as the belts enter the serpentine path at the top of the roller 20. These difficulties are overcome by properly controlling the convergence of the belts 48 and 50 between the periphery of the roller 30 and the entrance to the serpentine path at roller 20. As illustrated in FIG. 4, the convergence of the belts is controlled in two ways. In the fist place, the roller 32 is mounted in such a position that it supports the reach of the belt 50 between the roller 30 and the serpentine path in a convex condition so that the belts first converge at a predetermined angle in the belt portion between rollers 30 and 32 and then converge at a smaller predetermined angle between the roller 32 and the serpentine path. With this arrangement, the pressure applied by the belts between the roller 32 and the serpentine path can be quite substantial whereas if this pressure were applied in the larger angle convergence section between rollers 30 and 32, the fruit may be forced to the right as illustrated in FIG. 4 and thus pile up without entering the serpentine path.

Additionally, the convergence of the belts is controlled by adjustably mounting the rollers 30 and 32 so that they may be moved toward and away from the belt reach 52 depending upon the tension of the belt 50. Thus, a pair of arms 54 and 56 are pivotally mounted on the side frame members 16 and 18 by means of pivot bolts 58, and a pair of adjustable legs 60 support the free ends of the arms 54 and 56 at clamps 62 received in slots in the legs 60. The axles of the rollers 30 and 32 are mounted in the arms 54 and 56 so that the two rollers may be moved simultaneously toward or away from the belt reach 52.

*Belt drive*

Figure 6:
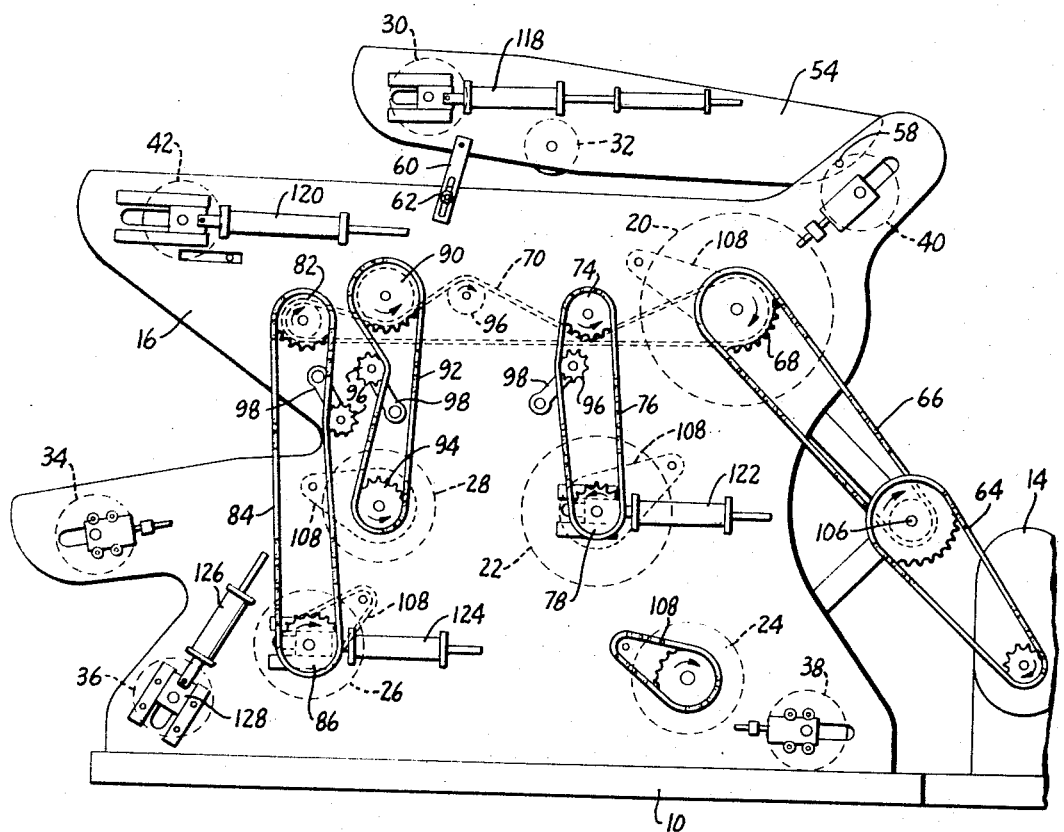
FIG. 6 is a side elevational view of the press of FIG. 1 illustrating the side of the press not visible in FIG. 1.

With reference to FIGS. 1 and 6, the motor of transmission 14 is connected to drive the roller 20 by a pair of chains 64 and 66 and a sprocket 68 on the axle of roller 20. A second sprocket on the axle of roller 20 on the opposite side of the machine drives a chain 70 from which the rollers 22, 26 and 28 are driven.

Thus, a sprocket 72 (FIG. 1) on one side of the machine engages the chain 70 and rotates an axle to which is connected on the other side of the machine a sprocket 74 (FIG. 6) which is connected by chain 76 to a sprocket 78 on the axle of roller 22. A sprocket 80 (FIG. 1) engages the chain 70 on one side of the machine and drives a coaxial sprocket 82 on the other side of the machine which drives chain 84 and sprocket 86 on the axle of roller 26. A sprocket 88 engages the chain 70 on one side of the machine and drives sprocket 90, chain 92, and chain 94 on the other side of the machine, with chain 94 mounted on the axle of roller 28. Chain tensioning idlers 96 mounted on swing arms 98 are provided in engagement with the chains 70, 76, 84, and 92 to take up slack in the chains.

The roller 24 is driven by a sprocket 100 on its axle, a chain 102, and a sprocket 104 which is keyed to a shaft 106 which carries on its opposite end sprockets engaging the chains 64 and 66.

As indicated below, the numbers of teeth on the various drive sprockets are selected to provide increasing peripheral speeds of the driven rollers at progressive points along the serpentine path. Additionally, overriding slip clutches are provided in the drive train for each of the driven rollers 22, 24 26 and 28, these slip clutches being of the well-known type which provide a positive driving connection until a predetermined resistance to drive is reached, and then the clutches slip while applying torque to the shafts which they drive. These slip clutches which are not illustrated in the drawing are provided as the connections between the sprocket 100 and the shaft on which it is mounted, the sprocket 78 and the shaft on which it is mounted, the sprocket 94 and the shaft on which it is mounted, and the sprocket 86 and the shaft on which it is mounted.

As illustrated in FIGS 1 and 6, a sprocket is mounted on the axle of each of the rollers 20–28 for driving a separate chain 108, and a similiar chain 108 is driven by a sprocket on the axle of roller 42. The chains 108 are connected to sprockets which are keyed to shafts 110 which extend through the machine adjacent to each of the rollers 20–28 and 42 and carry a rotary brush (not shown) between the side frame members 16 and 18 and in engagement with one of the main rollers for brushing fruit juice and pulp off of the surfaces of the rollers.

*Belt tensioning*

A control panel 112 is mounted on the machine above the arms 54 and 56 and carries a plurality of pressure gauges 114 and adjustable pressure reducing valves 116. All of the pressure reducing valves are connected to a single conduit which may be connected to a source of compressed air, and the five pressure reducing valves are connected to five sets of pneumatic cylinders 118, 120, 122, 124 and 126. The sets of pneumatic cylinders are connected between the frame members of the machine and the axles of approximately every other roller along the path of each of the belts 48 and 50 as illustrated in FIGS. 1 and 6. Each set of pneumatic cylinders includes a cylinder mounted at each end of the roller axis to which the set of cylinders is connected, and the axles are mounted in sliding journals as illustrated for example at 128 in FIG. 6 so that pressure delivered to the pneumatic cylinders forces the roller axles and the rollers in a direction which increases the tension of the belts 48 and 50. In this way, the pressure reducing valves 116 and pneumatic cylinders 118–126 apply tension to the belts 48 and 50 where the tension is a direct function of the air pressure in the single pneumatic source to which the control panel 112 is connected. Any one of the pressure reducing valves 116 may be adjusted to change the pneumatic pressure in its pair of pneumatic cylinders and thereby alter the belt tension in a local area in the machine, and the belt tension throughout the machine may be adjusted by adjusting the air pressure of the pneumatic source.

Figure 5:
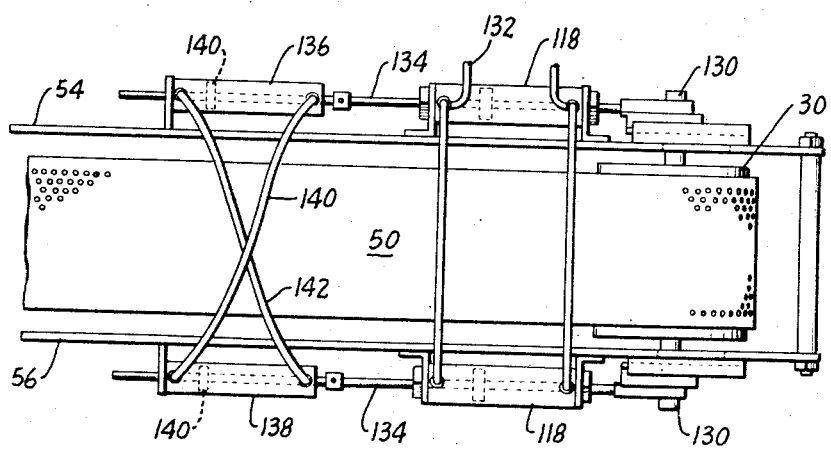
FIG. 5 is a top plan view of the belt support means of the upper belt at the input end of the press.

As illustrated in FIGS. 5 and 6, a special arrangement is provided for control of the pneumatic cylinders 118 to insure that the axle 130 of the roller 30 is moved by equal distances on opposite sides of the belt 50. This arrangement is desirable to control skewing of the roller 30 since the roller 30 has relatively long reaches of belt on both sides of it, and skewing of the roller 30 tends to draw the belt 50 toward one of the side arms 54 and 56. Thus, the pneumatic cylinders 118 are provided with an air inlet conduit 132 which is adapted to apply air pressure to the piston inside the cylinders 118 and thereby exert belt tensioning forces on opposite ends of the axle 130. In order to insure that the pistons in both of the cylinders 118 travel the same distance in response to a given pressure applied at the conduit 132, the piston rods 134 of the cylinders 118 are extended rearwardly into a pair of cylinder 136 and 138. A piston 140 is mounted on each of the piston rods 134 in one of the cylinders 136 and 138 to divide the cylinders 136 and 138 into forward and rearward chambers. These forward and rearward chambers are completely filled by an incompressible fluid such as oil and cross-connected by conduits 140 and 142 so that the forward chamber in cylinder 136 is connected to the rear chamber of cylinder 140 so that movement of either of the piston rods 134 in a given direction must be accompanied by equal movement of the other piston rod 134 in the same direction.

This pneumatic control apparatus provides means for applying belt tension throughout the entire lengths of the two belts 48 and 50. As indicated above, means are provided for driving the drive rollers 20–28 at differential peripheral speeds to provide additional contol for belt tension at the progressive stages of the serpantine path. The drive rollers do not rotate at substanially different peripheral speeds since the slip clutches will slip to permit each roller to turn at a peripheral speed equal to the speed of the belt it engages. However, this means for providing a differential drive speed is effective to remove slack from adjacent portions of the belt and maintain constant tension components on the belts as the thickness of the fruit pack varies. As indicated above, the slip clutches slip only when the roller which they are driving resists rotation by a predetermined torque, and hence whenever a given one of the slip clutches is slipping, it is applying a torque to the roller it drives to thereby pull on the belt entrained over the roller and apply additional tension to the belt and additional pressure on the fruit at the periphery of the roller immediately "upstream" in the serpentine path.

Thus, considering the rollers 24, 26 and 28 which have equal diameters, the numbers of teeth on the sprockets which drive the rollers are selected to drive roller 24 at a peripheral speed of 195 feet per minute, roller 26 at a peripheral speed of 195.5 feet per minute, and roller 28 at a peripheral speed of 196 feet per minute. With this arrangement, and assuming that the slip clutch on the axle of roller 24 is not slipping, the slip clutches on the axles of rollers 26 and 28 do slip, and by reason of the fact that they are slipping, additional tension is applied to the reach of belt 48 between rollers 24 and 26 and the reach of belt 50 between rollers 26 and 28.

Belt construction

Figure 2A:
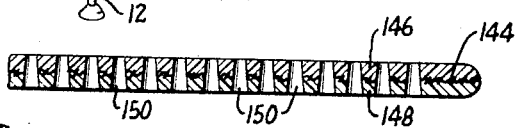
FIG. 2A is a cross-sectional view of the belts of FIG. 2.
Figure 2:
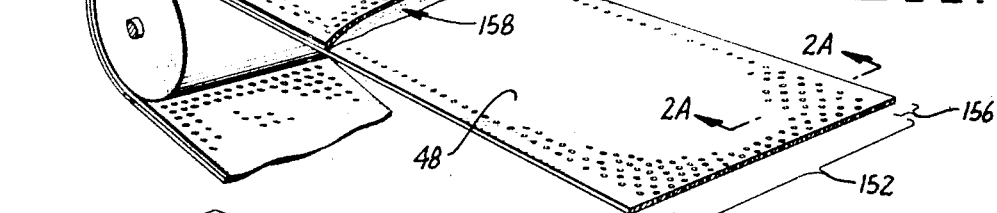
FIG. 2 is a perspective view of a portion of the perforated belts in the press of FIG. 1.
Figure 3:
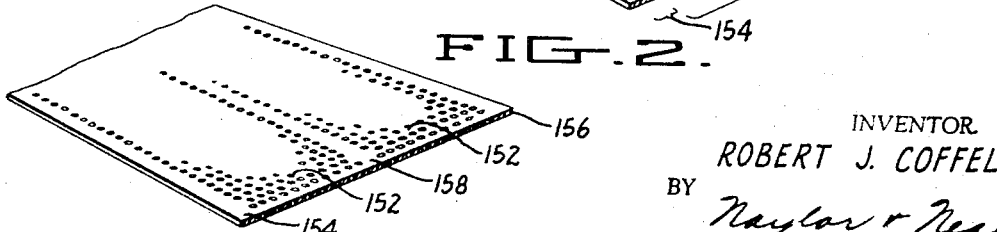
FIG. 3 is a perspective view of another belt which may be used in place of either of the belts of FIG. 2.

With reference to FIGS. 2, 2A, and 3, each of the belts 48 and 50 comprises an endless web of synthetic plastic. The particular synthetic plastic should be selected to have substantial flexibility and resistance to fatigue and also substantial resistance to stretching. The plastic should be free of solvents and should be substantially inert to the fruit juices which are to be extracted with the press. Suitable plastics for this purpose are plastics sold under the trademark nylon and plastics sold under the trademark Delrin. In some instances particularly where the belt is to be subjected to very high tension, it may be desirable to incorporate reinforcing materials into the belt. Thus, as indicated in FIG. 2A, the belt may be made with a central layer 144 of glass fibers or the like covered by two layers 146 and 148 of the selected plastic resin with all three layers perforated as at 150.

Very substantial advantages are obtained in the construction of the belt by providing endless portions of the belt which are unperforated and carry a substantial portion of the tension of the belts. Thus, as illustrated in FIG. 2, a narrow belt for the press includes a central endless perforated portion 152 and two marginal unperforated portions 154 and 156. Illustratively, the marginal portions 154 and 156 may each be approximately three-quarters of an inch wide while the central portion 152 may be about four and one-half inches wide. The provision of unperforated strips on the margins of the belts provides not only control for stretching of the belts but also a substantial advantage in retaining the fruit pack between the belts. Thus, as illustrated in FIG. 2, a fruit pack 158, which may be grape pomace is held between the belts 48 and 50. The central perforated portions of the belts are subjected to substantially more stretching than the marginal unperforated portions so that the belts 48 and 50 tend to bulge in the center while the marginal portions 154 and 156 firmly engage each other to prevent any loss of pomace at the edges of the belt.

As illustrated in FIG. 3, the unperforated strips in the belts are preferably repeated at interior portions where wider belts are used. Thus, the belt in FIG. 3 has two interior endless perforated strips 152 which may each be about four inches wide, two marginal unperforated strips 154 and 156, and a central endless unperforated strip 158.

Vacuum stripping

As indicated above, it may be desirable to apply suction stripping to one or more of the later stages in the press, and as illustrated in FIG. 4, this vacuum stripping may be accomplished by applying a hollow shoe 160 over the belts 48 and 50 at the periphery of drive roller 26 with the hollow shoe connected to a conduit 162 which may be connected to a vacuum pump. Alternatively, the suction stripping may be provided by perforating the surface of the drum 26 and mounting a pair of baffles inside the drum extending between the points where the belt 48 enters and leaves the periphery of the drum. A vacuum conduit may then be connected to the interior of the drum between the stationary baffles and the rotary surface of the drum to suck fruit juices through the belt and into the drum.

While certain features and advantages of the invention have been described in detail herein, it is obvious that may modifications thereof may be made without departing from the spirit and scope of the invention.

I claim:
1. In a serpentine fruit press having:
   (A) a frame,
   (B) a plurality of rollers mounted on said frame and defining a serpentine path,
   (C) a pair of endless belts mounted on said frame for movement along their lengths with said belts having first portions spaced apart from each other and extending into said serpentine path and second portions thereof entrained over said rollers and extending along said serpentine path adjacent to each other,
   (D) means for maintaining said second portions of said belts under tension,
   (E) drive means for moving said belts along said serpentine path, and
   (F) means for introducing fruit between said first portions of said belts, the improvement comprising:
      (1) support means including first and second rollers mounted on said frame with one of said rollers mounted in rolling engagement with said first portion of one of said belts adjacent to the position where said belts enter said serpentine path, and
      (2) adjusting means interconnecting said frame and said first roller for moving said first roller toward and away from the other one of said belts for adjusting the angle at which said first portions of said belts approach each other as they enter said serpentine path.

2. The improved serpentine press of claim 1 characterized further in that each of said endless belts comprises an endless sheet of synthetic plastic material having a pair of endless marginal portions and an endless mid-portion between and generally parallel to said marginal portions with said sheet perforated in said mid-portion and unperforated in said marginal portions.

3. The apparatus of claim 2 in which said mid-portion has an intermediate endless strip therein positioned between and generally parallel to said marginal portions with said strip unperforated throughout its length and separated from each of said marginal portions by perforations.

4. The improved serpentine press of claim 1 characterized further in that:
   (A) said plurality of rollers includes a first drive roller mounted on said frame with its periphery in contact with one of said second belt portions on one side of said serpentine path, a second drive roller mounted on said frame with its periphery in contact with said one of said second belt portions on said one side of said serpentine path, and a third drive roller mounted on said frame with its periphery in contact with the other one of said second belt portions on the other side of said serpentine path and at a position along the length of said serpentine path between said first and second drive rollers, and
   (B) said drive means comprises first drive means for rotating said first drive roller clockwise at a first predetermined peripheral speed, second drive means for rotating said third drive roller counter-clockwise at a second predetermined speed greater than said first predetermined peripheral speed, third drive means for rotating said second drive roller clockwise at a peripheral speed greater than said second predetermined speed, and slip clutches forming a part of at least two of said first, second and third drive means.

5. The improved serpentine fruit press of claim 1 in which a plurality of idler rollers are mounted on said frame in engagement with at least one of said belts, with each of said belts supported by a series of said rollers, and said means for maintaining said belts under tension comprises a single source of fluid pressure, and a plurality of fluid pistons connected to said single source of fluid pressure with said fluid pistons connected between said frame and the axles of approximately every other one of said rollers in each of said series for increasing the tension on the belts at said every other roller responsive to increased pressure of said single source.

6. A fruit press comprising:
   (A) a frame,
   (B) a pair of endless belts having adjacent belt portions with said belt portions positioned generally parallel to each other and extending along a serpentine path,
   (C) a first roller mounted on said frame with its periphery in contact with one of said belt portions on one side of said path,
   (D) a second roller mounted on said frame with its periphery in contact with said one of said belt portions on said one side of said path,
   (E) a third roller mounted on said frame with its periphery in contact with the other one of said belt portions on the other side of said path with said roller positioned along the length of said path between said first and second rollers,
   (F) drive means for rotating said first roller clockwise at a first predetermined peripheral speed,
   (G) drive means for rotating said third roller counter-clockwise at a second predetermined peripheral speed greater than said first determined peripheral speed,
   (H) drive means for rotating said second roller clockwise at a peripheral speed greater than said second predetermined peripheral speed, and
   (I) slip clutches forming a part of at least two of said three drive means.

7. In a serpentine fruit press having:
   (A) a frame,
   (B) a plurality of rollers mounted on said frame and defining a serpentine path,
   (C) a pair of endless belts mounted on said frame for movement along their lengths with said belts having first portions spaced apart from each other and extending into said serpentine path and second portions thereof entrained over said rollers and extending along said serpentine path adjacent to each other,
   (D) means for maintaining said second portions of said belts under tension,
   (E) drive means for moving said belts along said serpentine path, and
   (F) means for introducing fruit between said first portions of said belts, the improved belts in which each of said belts comprises:
      (1) an endless sheet of synthetic plastic material having a pair of endless marginal portions and an endless mid-portion between and generally parallel to said marginal portions with said sheet perforated in said mid-portion and unperforated in said marginal portion.

8. The improved serpentine press of claim 7 in which said mid-portion has an intermediate endless strip therein positioned between and generally parallel to said marginal portions with said strip unperforated throughout its length and separated from said marginal portions by perforations.

9. In a serpentine fruit press having:
   (A) a frame,
   (B) a plurality of rollers mounted on said frame and defining a serpentine path,
   (C) a pair of endless belts mounted on said frame for movement along their lengths with said belts having first portions spaced apart from each other and extending into said serpentine path and second portions thereof entrained over said rollers and extending along said serpentine path adjacent to each other,
   (D) drive means for moving said belts along said serpentine path, and
   (E) means for introducing fruit between said first portions of said belts, the improved means for maintaining said belts under tension which comprises:
(1) a single source of fluid pressure, and
(2) a plurality of fluid pistons connected to said single source of fluid pressure with said fluid pistons connected between said frame and the axles of approximately every other one of said rollers which contacts each of said belts for increasing the tension on the belts at said every other roller responsive to increased pressure of said single source.

References Cited

UNITED STATES PATENTS

| | | | |
|---|---|---|---|
| 692,823 | 2/1902 | Bremer | 100—120 X |
| 1,241,905 | 10/1917 | Behr | 100—118 X |
| 1,599,376 | 9/1926 | Smith | 100—151 |
| 1,985,323 | 12/1934 | McCall | 100—152 |
| 2,724,508 | 11/1955 | Luther | 100—122 |
| 3,106,152 | 10/1963 | Coffelt | 100—118 |
| 3,130,667 | 4/1964 | Coffelt | 100—118 |

PETER FELDMAN, *Primary Examiner.*

U.S. Cl. X.R.

100—151